Figure 1:
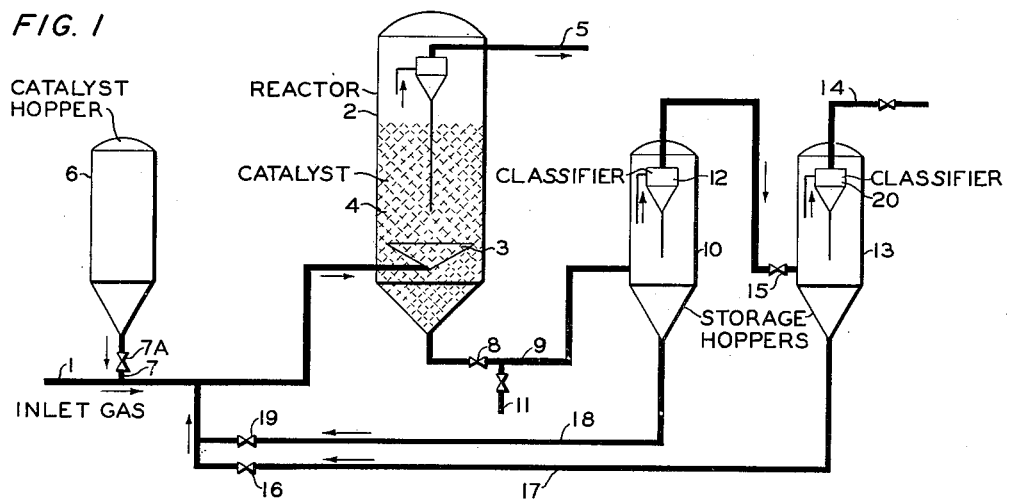

Oct. 30, 1951 A. H. FRIEDMAN 2,573,559
METHOD FOR REPLACING DEACTIVATED HYDROCARBON
SYNTHESIS CATALYST WITH FRESH CATALYST
Filed June 21, 1948

INVENTOR.
ALVIN H. FRIEDMAN
BY Hudson and Young
ATTORNEYS

Patented Oct. 30, 1951

2,573,559

UNITED STATES PATENT OFFICE 2,573,559

METHOD FOR REPLACING DEACTIVATED HYDROCARBON SYNTHESIS CATALYST WITH FRESH CATALYST

Alvin H. Friedman, Kansas City, Mo., assignor to Phillips Petroleum Company, a corporation of Delaware Application June 21, 1948, Serial No. 34,177

6 Claims. (Cl. 260—449.6)

This invention relates generally to a process for the synthesis of hydrocarbons. In one of its aspects this invention relates to a process for synthesizing hydrocarbons wherein carbon monoxide and hydrogen are contacted with a suitable fluidized catalyst. This invention is useful for introducing fresh and/or regenerated catalyst into a hydrocarbon synthesis reaction zone.

It is well known that there are many processes in which it is necessary to contact gases with solid catalysts; and, as an efficient means of effecting the contact, the fluidized catalytic bed has been developed wherein the catalyst is used in a finely divided state affording a large area of contact. The reactant gases are passed upwardly through the catalyst bed, and particles of the finely divided catalyst become suspended in the upward flowing gases. By proper regulation of the linear velocity of the upward flowing influent gas it is possible to maintain the finely divided catalyst in a constant state of turbulence, and it has been found that under proper control the catalyst will act in a manner similar to a liquid. Thus, the name of "fluidized catalytic bed" has been given to this type of operation.

A "fluidized bed" affords numerous advantages over other types of catalytic operations. First, it is possible to handle the catalyst as though it were a liquid. For example, gases can be "bubbled" through the catalyst, and the fluidized catalyst can be made to flow freely. Also, during the "bubbling" operation, only relatively small amounts of the finely divided catalyst are carried by the gas out of the reaction zone and hence the difficulty of separating the catalyst from the effluent gas is very slight. Also, the catalyst tends to form a definite interface between the "fluidized" state and the "vapor" state which is similar to the line of demarcation between a liquid and its vapor. Thus, the catalyst can be dealt with as though it were a liquid.

The "fluidized bed" type of operation presents difficulties, some of which have been solved, but one unsolved problem may occur either at the initiation of the reaction or during the introduction of a fresh catalyst into the reaction zone while in operation. A fresh or regenerated catalyst is frequently difficult to control when introduced into the reaction zone for the first time, particularly in a hydrocarbon synthesis reaction (i. e., reaction of CO with $H_2$) which is highly exothermic. There is a sudden burst of activity and the cooling means are unable to cope with the suddenly liberated heat. Consequently, the temperature in the reaction zone rises above the desirable operating limits with resultant injury to the catalyst. Coupled with the high activity of the catalyst is a relatively low efficiency causing what is termed a "wild" reaction and resulting in large yields of methane, ethane and water and small yields of the higher molecular weight products. After a period of time the catalyst will assume its normal activity and produce the higher molecular weight hydrocarbons and oxygenated organic compounds but, during the period of the "wild" reaction, there has been a loss of operating time and a decrease in production of the desired products.

A method of overcoming this difficulty is to start the reaction at a low temperature and at a low space velocity and to increase the temperature and space velocity gradually as the activity of the catalyst decreases. In this manner the amount of reaction is controlled and the temperature is kept within the desired range. This procedure has been termed the "breaking-in- period," and at the end of this period the reaction may proceed under normal operating conditions. This "breaking-in" procedure is not completely satisfactory, since the catalysts which are broken in, in this manner, frequently do not have the desired activity during the synthesis process and the products formed with them often contain large amounts of heavy hydrocarbons and waxes which are usually undesirable products from a hydrocarbon synthesis reaction. Furthermore, in the reaction zone the waxes are deposited on the catalyst with a consequent reduction in catalyst activity and in reaction products.

An object of this invention is to provide an improved method for initiating a catalytic hydrocarbon synthesis reaction without injury to the catalyst. An additional object is to provide a method for introducing fresh and/or regenerated catalyst into a hydrocarbon synthesis reactor while in operation without injury to the catalyst and without interruption of the synthesis process. A further object is to provide an improved method for initiating a hydrocarbon synthesis reaction or for introducing a new and/or regenerated catalyst to a hydrocarbon synthesis reaction at controlled reaction conditions. Additional and further objects will be apparent from this disclosure of my invention.

I have found that the above-mentioned difficulties can be overcome by controlling the catalyst activity at the reaction temperature so that the catalyst is not harmed and the product is of the desired nature by using a "break-in catalyst" which may be a used or spent catalyst or a catalyst of low efficiency or a normal catalyst made specifically for this purpose. I initiate the reaction with the break-in catalyst in the reactor under the desired reaction conditions. With the reaction proceeding under normal conditions, fresh catalyst is added to the reactor in such quantity and in a manner that no substantial change in reaction conditions occurs. Either simultaneously with the addition of the fresh catalyst or shortly thereafter a substantially corresponding quantity of catalyst is withdrawn from the reactor. The reaction is maintained at the desired reaction conditions, during the addition and withdrawal of catalyst and the fresh catalyst is thus broken in under controlled conditions and at low fresh catalyst concentrations. Thus, the difficulties of the "wild" reaction are eliminated and conditions that cause injury to a fresh or regenerated catalyst are obviated.

Throughout my entire disclosure and claims fresh catalyst is meant to include both new, unused catalyst and regenerated catalyst.

It is essential to the success of my invention that the fresh catalyst and the "break-in" catalyst differ substantially in at least one physical property, e. g. particle size, in order that the catalyst withdrawn from the reactor may be separated into the fresh and break-in portions. The fresh catalyst portion is returned to the reactor while the "break-in" catalyst may be regenerated or retained in its used condition for future use. If catalysts of differing particle size are used, the difference in particle size between the two catalysts should be at least 10 mesh and preferably 25 mesh so that the separation may be performed readily and completely. Since the conditions of the reaction must be controlled, the rate of addition and withdrawal or the rate of replacement of catalyst is an important feature of the invention. It has been found that a complete replacement of catalyst can be accomplished under normal operating conditions in from 20 to 48 hours, and often in about 24 hours.

The practice of this invention is here described by reference to a vertical cross-sectional drawing of a portion of a fluidized hydrocarbon synthesis process for which it is particularly adapted. As shown in the diagrammatic flow sheet in Figure 1 of the drawing, the synthesis gas, which is made up of hydrogen and carbon monoxide in the proportion of 2 mols hydrogen to 1 mol of carbon monoxide, comes from a preheater (not shown) through line 1 into reactor 2 through distributor 3 and passes up through "fluidized break-in" catalyst 4 where the desired reaction occurs. The effluent leaves through line 5 and passes to conventional and well-understood refining operations (not shown). When the reaction is lined out at steady conditions, for example at a temperature of 320° C. and pressure of 300 p. s. i. g., some fresh catalyst is added from hopper 6 through valve 7A in line 7 and is carried into reactor 2 by the influent synthesis gas entering through line 1. At the same time, valve 8 is opened and an equal amount of break-in catalyst is withdrawn through line 9 into storage hopper 10. When sufficient catalyst is accumulated in hopper 10, an inert gas stream is admitted through line 11 after valve 8 is closed, and the rate is so adjusted that the break-in catalyst, which in this case is more coarse than the fresh catalyst, is returned to hopper 10 by classifier 12, which may be a cyclone separator. The fresh catalyst, which is relatively fine, is blown through valve 15 into storage hopper 13 provided with classifier 20, which retains the catalyst and allows the inert gas to be withdrawn through line 14. When sufficient catalyst has accumulated in hopper 13 valve 15 is closed, and pressure is put on line 14. The used and thus broken-in fresh catalyst is forced back into reactor 2 by opening valve 16 in line 17. By the procedure described, the break-in catalyst is gradually removed from the reactor and is replaced by broken-in fresh catalyst. The break-in catalyst may be stored until it is desired to be used again whereupon it can be returned to the reactor through line 18 and valve 19 by putting pressure on the hopper 10 through line 11. The above description and the alternative embodiments that follow contemplate that the addition of fresh catalyst and the withdrawal of catalyst from the reactor may be either intermittent or continuous operations.

Figure 2:
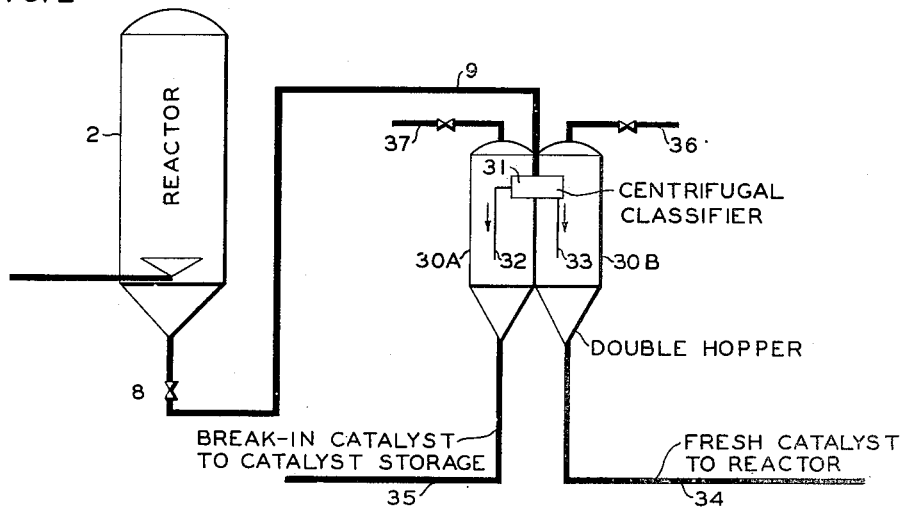

Figure 2 illustrates another embodiment of my invention having a modified catalyst classification system. A mixture of the fine and the coarse catalyst, treated in reactor 2 as previously described, is withdrawn through line 9 by opening valve 8. The catalyst mixture is passed to double hopper, which is made up of sections 30A and 30B having a common wall or element of tangency. This double hopper is equipped with centrifugal classifier 31, which discharges the coarse catalyst through peripheral outlet 32 into section 30A and the fine catalyst through nonperipheral outlet 33 into section 30B. Instead of a centrifugal classifier, other conventional classification or separation means may be used, such as screening, gravity separation, or flotation methods. Any gaseous material accompanying the catalyst mixture is removed through valved outlets 36 and 37 and is returned to the conversion system by means not shown. After the desired amount of catalyst mixture has been withdrawn from reactor 2, valve 8 is closed. By application of suitable gas pressure through valved outlets 37 and 36, the catalysts accumulated in sections 30A and 30B may be withdrawn through outlets 35 and 34, respectively. Through means not shown, the fine catalyst may be returned to reactor 2 for further use, and the break-in catalyst may be stored for subsequent use or it may be regenerated in means not shown.

In another embodiment, two catalysts of different particle size may be used alternately. In a first cycle, the relatively coarse catalyst may be used for the synthesis reaction until the activity of the catalyst becomes too low for efficient operation. It is then gradually replaced by the relatively fine catalyst, and it serves, during the replacement, as the break-in catalyst. The coarse catalyst is then separated from the fine catalyst, as previously described, and it is regenerated by any means known in the art. In a second cycle, the regenerated coarse catalyst gradually replaces the fine catalyst, and which has become deactivated during the synthesis reaction in this cycle, the fine catalyst serving as the break-in catalyst. It may then be regenerated and used to replace the coarse catalyst as in the first cycle, described above.

As hereinbefore stated this invention can be used either to initiate the catalytic synthesis reaction or to replace a used catalyst with a fresh catalyst without interrupting the synthesis process. In either case the used or "break-in" catalyst is in the reactor under normal operating conditions, and it is gradually replaced by the fresh catalyst. In both cases I prefer to use a procedure that is similar to at least one of the embodiments described above. In addition to being used with reduced iron catalysts in a Fischer-Tropsch reaction, the invention can also be adapted for use with fluidized nickel, cobalt and other hydrocarbon synthesis catalysts that have undesirably high initial activities.

It is also within the scope of my invention to use physical properties of the catalyst particles other than particle size as a means for carrying out my process. Thus, in practicing my invention it is possible to use catalysts of differing densities wherein the more dense and the less dense catalysts are used in place of the coarse and fine catalysts as described above. The catalyst particles of differing density are readily separable by well-known and conventional methods among which are centrifugal classification and screening. It is apparent that other physical properties of the catalysts might be employed, but the essential requirement is that the catalysts differ in at least one physical property in order that a separation of catalyst particles may be readily effected. When employing other physical properties, it may be desirable or necessary to employ separation means other than a cyclone or centrifugal separator to effect a separation of the fresh and spent or break-in catalyst, but such alterations are not beyond the purview of my invention.

Numerous variations in my invention will be apparent to one skilled in the art in accordance with the above disclosure.

Both catalysts used in this invention will have a particle size in the broad range of about 40–400 mesh. Thus, for example, the break-in catalyst may have an average particle size of about 60 mesh and the fresh catalyst an average particle size of about 150 mesh.

I claim:

1. In a process for the synthesis of hydrocarbons and oxygenated organic compounds utilizing a fluidized catalyst bed wherein finely divided particles of a suitable catalyst are suspended in a gaseous stream comprising hydrogen and carbon monoxide, the improvement which comprises carrying out the reaction in the presence of a fluidized bed of catalyst of a given average particle size and of substantially diminished catalytic activity and at operating reaction conditions; introducing to the reaction zone fresh fluidizable catalyst, having an average particle size differing by at least 10 mesh size from the average particle size of said catalyst of substantially diminished catalytic activity, in such a manner and in such quantity that no substantial change in the operating conditions occurs; withdrawing from the reaction zone at a point below the upper level of the fluidized catalyst bed a portion of the catalyst contained therein which portion comprises fresh catalyst and catalyst of diminished catalytic activity; separating from said withdrawn portion of catalyst by difference in particle size the fresh catalyst contained therein; returning said separated fresh catalyst to the reaction zone; and continuing the above-described steps at such a rate and until the said fluidized bed of catalyst of diminished catalytic activity has been substantially completely replaced by a fluidized bed of the fresh catalyst having different average particle size from said catalyst of diminished activity.

2. A process according to claim 1 wherein the particle size of the fresh catalyst differs from that of the catalyst of diminished catalytic activity by at least 25 mesh size and wherein the fresh catalyst and the catalyst of diminished activity each has a particle size within the range of 40 to 400 mesh.

3. The method of effecting a catalytic synthesis of hydrocarbons which comprises suspending in the form of a fluidized bed finely divided fluidizable particles of a suitable catalyst having an average particle size within the range of 40 to 400 mesh in an upward flowing stream of synthesis gas comprising hydrogen and carbon monoxide, continuing the synthesis reaction until the activity of the catalyst is lowered below that required for efficient operation, introducing fresh fluidizable catalyst whose average particle size is within the range of 40 to 400 mesh and differs by at least 10 mesh size from the average particle size of the catalyst present in the reaction zone into the reaction zone in such quantity and under such conditions that the synthesis reaction temperature is not substantially increased, withdrawing a portion of catalyst from the reaction zone at a point below the upper level of the fluidized catalyst bed approximately equal in quantity to the fresh catalyst introduced to the reaction zone, separating by difference in particle size said withdrawn catalyst into a fresh catalyst portion and a deactivated catalyst portion, returning said fresh catalyst portion to the synthesis reaction zone, continuing the above-described steps at such a rate and until the said fluidized bed of deactivated catalyst has been substantially completely replaced in the reaction zone by a fluidized bed of the fresh catalyst having different average particle size from said deactivated catalyst, continuing the hydrocarbon synthesis reaction in the presence of the thus-introduced fresh catalyst until the catalytic activity of said fresh catalyst becomes too low for efficient operation, reactivating the catalyst previously withdrawn from the reaction zone, introducing a portion of said reactivated catalyst to the reaction zone under such conditions and in such quantity that the synthesis reaction temperature is not substantially increased, withdrawing a portion of catalyst from the reaction zone approximately equal in quantity to the reactivated catalyst thus-introduced to the reaction zone, separating by difference in particle size said wtihdrawn catalyst into a reactivated catalyst portion and a deactivated catalyst portion, returning said reactivated catalyst portion to the synthesis reaction zone, and continuing the above-described steps at such a rate and until the said fluidized bed of deactivated catalyst has been substantially completely replaced in the reaction zone by a fluidized bed of the reactivated catalyst having different average particle size from said deactivated catalyst.

4. A method according to claim 3 wherein the catalysts are reduced iron oxide catalysts.

5. A process according to claim 1 wherein the catalyst of diminished catalytic activity is replaced by fresh catalyst in a period of time ranging from 20 to 48 hours.

6. A method according to claim 3 wherein the first named catalyst has a particle size of 60 mesh and the fresh catalyst has a particle size of 150 mesh.

ALVIN H. FRIEDMAN.

REFERENCES CITED

The following references are of record in the file of this patent:

UNITED STATES PATENTS

| Number | Name | Date |
| --- | --- | --- |
| 2,127,127 | Martin et al. | Aug. 16, 1938 |
| 2,349,574 | Conn | May 23, 1944 |
| 2,349,575 | Voorhees | May 23, 1944 |
| 2,360,787 | Murphree et al. | Oct. 17, 1944 |
| 2,406,851 | Redcay | Sept. 3, 1946 |
| 2,430,015 | Hatton et al. | Nov. 4, 1947 |
| 2,437,352 | Fragen | Mar. 9, 1948 |
| 2,445,796 | Millendorf | July 27, 1948 |
| 2,467,803 | Herbst | Apr. 19, 1949 |
| 2,467,861 | Scharmann | Apr. 19, 1949 |